(12) United States Patent
Shenoy et al.

(10) Patent No.: US 9,894,048 B2
(45) Date of Patent: Feb. 13, 2018

(54) COMMUNICATIONS METHODS AND APPLIANCES

(71) Applicant: HEWLETT-PACKARD DEVELOPMENT COMPANY, L.P., Houston, TX (US)

(72) Inventors: Rajesh K Shenoy, Cupertino, CA (US); Keith E Moore, Palo Alto, CA (US)

(73) Assignee: Hewlett Packard Enterprise Development LP, Houston, TX (US)

( * ) Notice: Subject to any disclaimer, the term of this patent is extended or adjusted under 35 U.S.C. 154(b) by 360 days.

(21) Appl. No.: 13/762,187

(22) Filed: Feb. 7, 2013

(65) Prior Publication Data

US 2013/0160090 A1    Jun. 20, 2013

Related U.S. Application Data

(62) Division of application No. 10/957,490, filed on Sep. 30, 2004, now Pat. No. 8,375,202.

(51) Int. Cl.
*H04L 29/06* (2006.01)
*G06F 21/00* (2013.01)
(Continued)

(52) U.S. Cl.
CPC .......... *H04L 63/08* (2013.01); *H04L 63/0823* (2013.01); *H04L 63/0428* (2013.01)

(58) Field of Classification Search
CPC .. H04L 63/08; H04L 63/0823; H04L 63/0428
(Continued)

(56) References Cited

U.S. PATENT DOCUMENTS 6,314,521 B1 * 11/2001 Debry .......................... 726/10
2002/0080959 A1 * 6/2002 Weller ......................... 380/55
(Continued)

FOREIGN PATENT DOCUMENTS

WO   WO-2003093942      11/2003
WO   WO 2008030523 A2 * 3/2008 ........... H04L 63/062

OTHER PUBLICATIONS

Chin-Tser Huang, John H. Gerdes, Jr.; "Privacy-preserving multi-dimensional credentialing using veiled certificates"; Apr. 2009; CSIIRW '09: Proceedings of the 5th Annual Workshop on Cyber Security and Information Intelligence Research: Cyber Security and Information Intelligence Challenges and Strategies; Publisher: ACM; pp. 1-14.*

(Continued)

*Primary Examiner* — Shewaye Gelagay
*Assistant Examiner* — Courtney Fields
(74) *Attorney, Agent, or Firm* — Wells St. John Roberts Gregory & Matkin PS

(57) ABSTRACT

Communications methods and appliances are described. According to one embodiment, a communications method includes prior to deployment of an appliance, establishing a trusted association between the appliance and a certificate authority, during deployment of the appliance, associating the appliance with a communications address of a communications medium, using the certificate authority, creating a signed certificate including the communications address of the appliance, announcing the signed certificate using the appliance, after the announcing, extracting the communications address of the appliance from the signed certificate, and after the extracting, verifying the communications address of the appliance.

17 Claims, 3 Drawing Sheets

(51) Int. Cl.
*H04L 9/08* (2006.01)
*H04L 9/30* (2006.01)

(58) Field of Classification Search
USPC .............................. 726/4, 10; 713/155, 171
See application file for complete search history.

(56) References Cited

U.S. PATENT DOCUMENTS

2003/0105963 A1* 6/2003 Slick et al. .................... 713/171
2005/0188193 A1* 8/2005 Kuehnel ............... G06F 21/445
713/155

OTHER PUBLICATIONS

"DHCP Secured IP Address Assignment," Sep. 29, 2001. <http://www.cisco.com/univerd/cc/td/doc/product/software/ios122/122new/122t/122t15/ftdsiaa.htm#73568>.
"docs.sun.com-Sun ProductDocumentation,"Sun Microsystems, Sep. 29, 2004. <http://docs.sun.com/db/doc/816=7264/6md9iem1p?a=view>.
"HP Jet Direct Administrator's Guide," Hewlett-Packard Development Company 2002-2003.
"Introduction to SSL, " Oct. 1998. <http://developer.netscape.com/docs/manuals/security/sslin/contents.html>.
"Security in HP Web Jetadmin, " Nov. 2003. <http://h10010.www1.hp.com/wwpc/pscmisc/vac/us/product_pdfs/websecur.pdf>.
"SSH IP SEC Express White Paper version 2.1," SSH Communications Security, Aug. 1999, < www.adimpleo.com /library/ssh/ipsec-wp.pdf>.

"UpnPTM Security Ceremonies Design Document," UpnPTM Device Architecture 1.01, Oct. 3, 2003.
Arkko et al, SEcure Neighbor Discovery (SEND) draft-ietf-send-ndopt-06, Jul. 17, 2004. <http://www.letf.org/internet-drafts/draft-ieff-send-ndopt-06.txt>.
Aura, "Cryptographically Generated Addresses," Apr. 16, 2004. <http://www.idtf.org/internet-drafts/draft-ietf-send-cga-06.bd>.
Barton et al, "Physical Registration: Configuring Electronic Directories using Handheld Devices," 2001. <http://lib.hpl.hp.com/techpubs/2001/HPL-2001-119.pdf>.
Hannah, "Configuring Security Parameters in Small Devices," Jan. 2002.
Kent, "IPSec Authentication Header," Mar. 2, 2004. <http://www.ietf.org/internet-drafts/draft-ietf-ipsec-rfc2402bis-07.txt>.
Kent, "IPSec Encapsulatin Security Payload (ESP)," Mar. 2004. <http://www.ietf.org/internet-drafts/draft-ietf-ipsec-esp-v3-08.txt>.
Mukkalama et al, "Active Certificates: A New Paradigm in Digital Certificate Management," Parallel Processing Workshops, 2002. Proceedings Internationa Conference on G+Digital Object Identifier, Feb. 2002.
Schneirer, "Applied Cryptography," John Wiley and Sons; (Textbook) 1996.
Shenoy, "Electronic Device Communication Methods, Appliance Verification Methods Appliance Programming Method," Filed concurrently.
Stajano et al, "The Resurrecting Duckling: Security Issues for Ad-hoc Wireless Networks," 1999.
Viega et al, "Network Security with Open SSL," Reily, (Textbook), Jun. 2002.

* cited by examiner

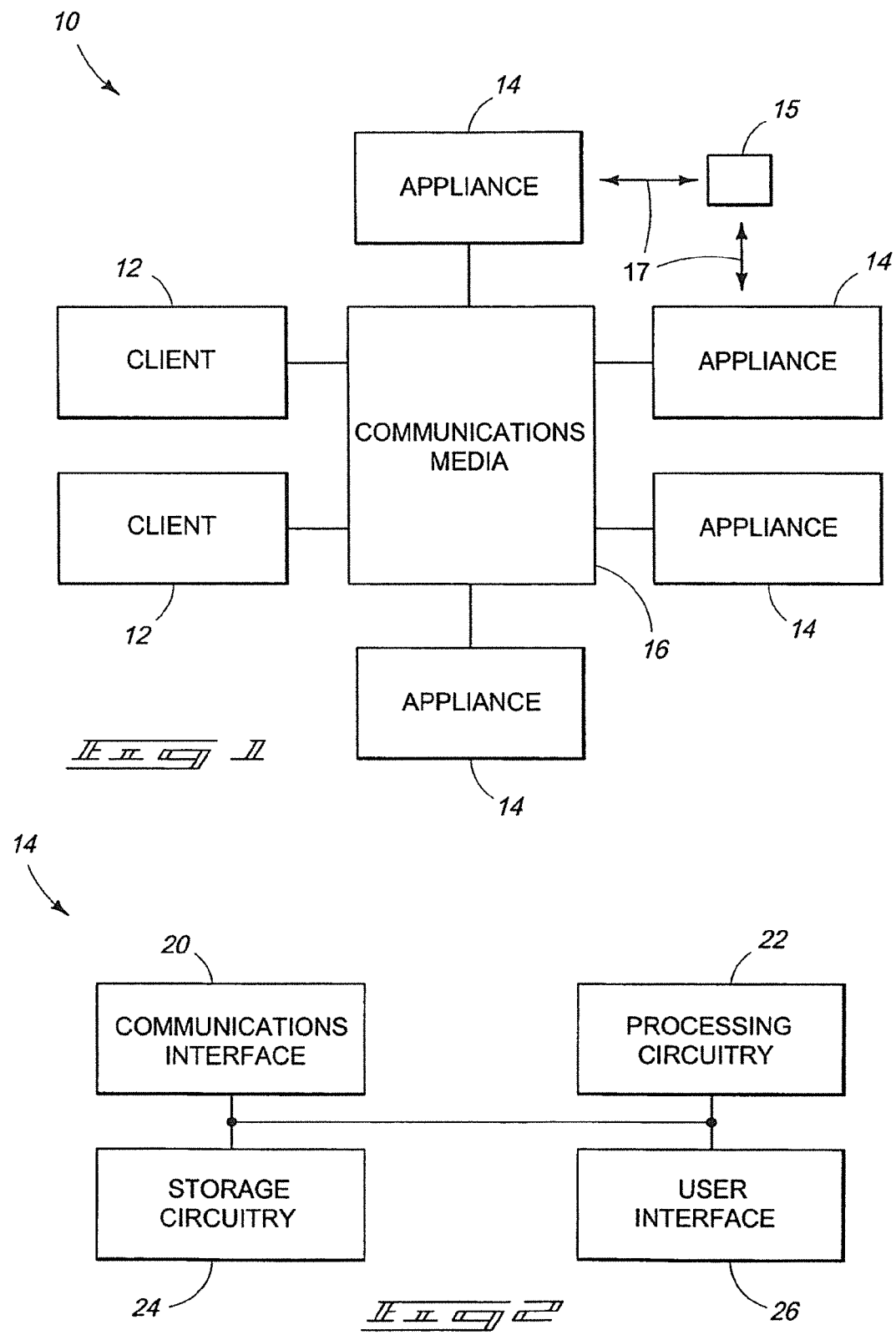

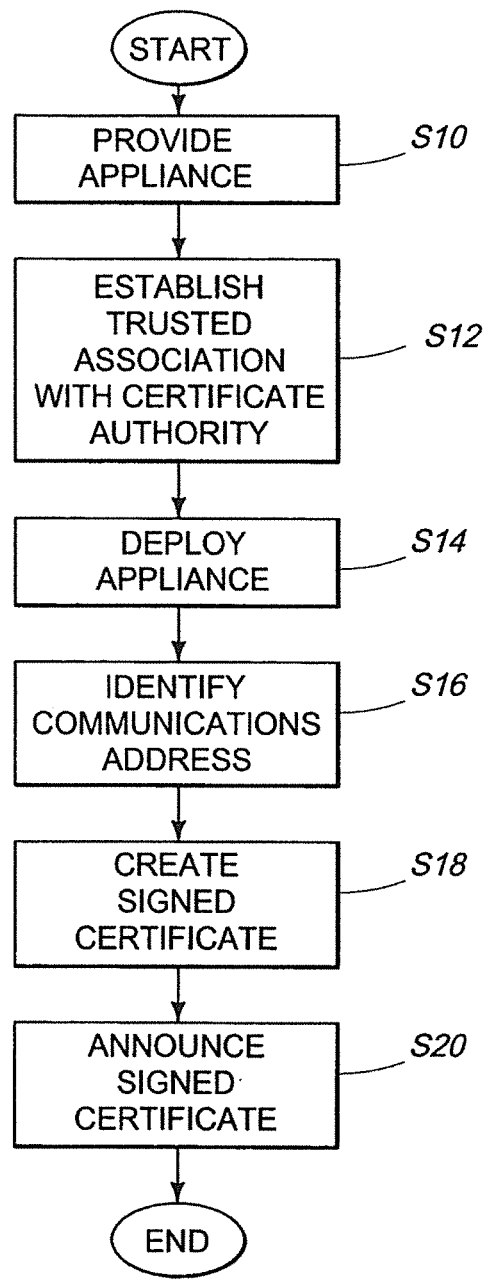

COMMUNICATIONS METHODS AND APPLIANCES

CLAIM FOR PRIORITY

The present application is a Divisional Application of commonly assigned and copending U.S. patent application Ser. No. 10/957,490, filed on Sep. 30, 2004, the disclosure of which is incorporated by reference herein in its entirety.

FIELD OF THE DISCLOSURE

Aspects of the disclosure relate to communications methods and appliances.

BACKGROUND OF THE DISCLOSURE

Over the past several years, there has been an increasing concern about the security of appliances such as disk drives, spoolers, printers, scanners and multi-functional peripherals. The concern is both around the privacy of the data being sent as well concern about whether one is interacting with the intended device or an imposter (i.e., is the printer address the one for the intended printer or a fraudulent address).

In the past, interception and "man in the middle" attacks were prevented by using 1-1 cables (such as centronix or universal serial bus). However, as appliances moved from being client peripherals to networked resources, the problem emerged of identifying the intended appliance and securing the communication to that appliance.

In the case of printers, a common approach (seen in many offices) has been to post a label of the printer name with its network address. In this manner, if an individual trusts the label, they could use that address to send a print job to the intended printer. Similar techniques are used for scanners, disk-drives, spoolers and other such appliances.

There are several problems with the label-based approach. The first is that many deployments-use the dynamic host control protocol (DHCP) and thus the address of the appliance can change over time. This means that while a client might have once had the correct address, the appliance address may change and the client can easily have a misdirected message. Similarly, an imposter might intentionally mislabel an appliance such as a printer to intercept print jobs in public venues such as coffee shops or airport lounges.

Some manufacturers provide a user interface on their appliance that will report the address of the appliance on a screen or (in the case of some printers) on a printout. This helps overcome the intentional/accidental mislabeling of a device, but does not address dynamic protocol update or re-configuration of the client devices.

In addition, the above techniques do not address privacy of the transmitted data and thus eaves-droppers can intercept sensitive documents/material.

Sensitive documents can be addressed through techniques such as the secure sockets layer (SSL). In this protocol, the client and server agree on a session key that is used to encode messages exchanged between the client and server.

Other methods include IP Security Protocol (IP-Sec) which replaces the Internet Protocol with a secured packet routing mechanism. IPSec ensures that a message will be delivered only to the destination address but doesn't secure the association of the target with the address (i.e., the mechanism of discovering the correct IP address for the appliance is not addressed by either IP-Sec or SSL).

An approach to certifying the destination has been to use a challenge in the initial message from the client to the target. The challenge is encrypted with a shared secret or other keying mechanism and only the rightful recipient should be able to answer the challenge and thereby affirm the identity. The issue here is one of key distribution. If the key is shared across a family of appliances, than the imposter can redirect the print job to a second printer and intercept the material. If the key is particular to a printer, then discovering that key is an issue and similar to discovering the printer's IP address noted above.

Thus there remains a need to discover the provenance of an appliance's address, and/or to communicate with that appliance in a secure manner. At least some aspects of this disclosure are related to improved apparatus and methods for implementing electronic communications between electronic devices such as an appliance and a client in one embodiment.

SUMMARY

According to some aspects, communications methods and appliances are described.

According to one embodiment, a communications method comprises prior to deployment of an appliance, establishing a trusted association between the appliance and a certificate authority, during deployment of the appliance, associating the appliance with a communications address of a communications medium, using the certificate authority, creating a signed certificate including the communications address of the appliance, announcing the signed certificate using the appliance, after the announcing, extracting the communications address of the appliance from the signed certificate, and verifying the communications address of the appliance.

According to another embodiment, an appliance comprises a communications interface configured to implement communications of the appliance with respect to a client via a communications medium after deployment of the appliance with respect to the communications medium, wherein the appliance is associated with a communications address of the communications medium upon deployment of the appliance and wherein a trusted association is established between a certificate authority and the appliance prior to deployment of the appliance, and processing circuitry coupled with the communications interface and wherein the processing circuitry is configured to access the communications address, to initiate creation of a signed certificate using the certificate authority and which includes the communications address, and to initiate announcement of the signed certificate including the communications address for use in verification of the communications address of the appliance.

DESCRIPTION OF THE DRAWINGS

FIG. 1 is a functional block diagram of a communications system according to one embodiment.

FIG. 2 is a functional block diagram of an electronic device appliance according to one embodiment.

FIG. 3 is a flow chart illustrating an exemplary method for providing a signed certificate according to one embodiment.

DETAILED DESCRIPTION

Figure 4:
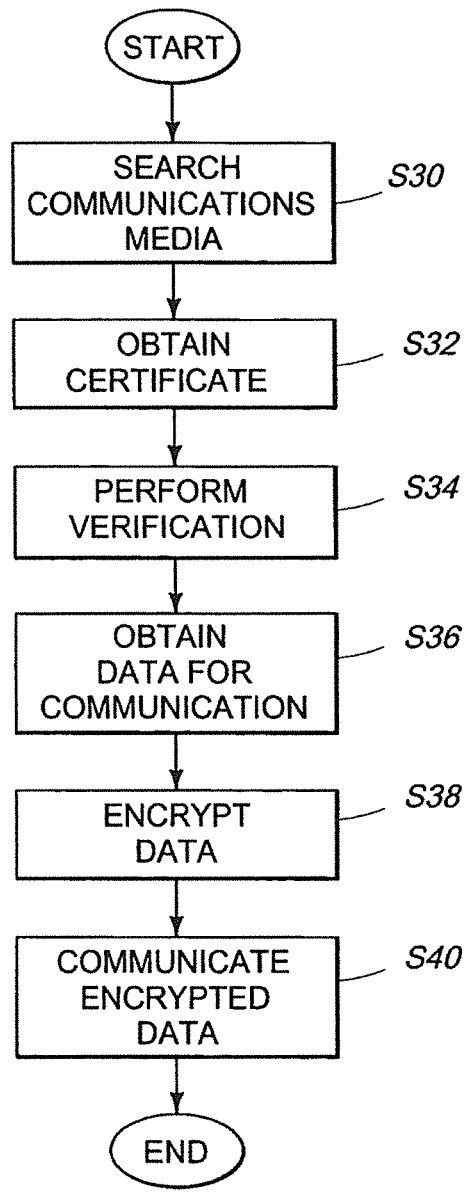
FIG. 4 is a flow chart illustrating an exemplary method for implementing communications according to one embodiment.

Referring to FIG. 1, an exemplary configuration of a communications system 10 is shown. Additional embodiments and aspects are described in the U.S. patent application Ser. No. 10/957,312, entitled "Electronic Device Communication Methods, Appliance Verification Methods, Appliance Programming Methods, Appliances, Articles Of Manufacture, And Client Electronic Devices," listing Rajesh Krishna Shenoy as inventor, the teachings of which are incorporated herein by reference.

Communications system 10 may include one or more electronic device clients (i.e., clients) 12, one or more electronic device appliances (i.e., appliances) 14, one or more external communications device 15, and communications media 16. In one example, communications system 10 is embodied as a networked arrangement of clients 12 configured to use the resources of appliances 14. Exemplary clients 12 include personal computers, workstations, and other electronic devices configured to implement electronic communications with respect to appliances 14 or other devices. Exemplary appliances 14 may have resources which may be accessed and used by clients 12 and may be embodied as printers, multi-functional peripherals, facsimile machines, scanners, copiers, disk drives, spoolers' or other configurations accessible by clients 12. In one embodiment, appliances 14 may comprise user-accessible devices which are configured to interact with a user during normal operation such as providing data to a user (e.g., provide printed media, copying media, displaying data, capturing data such as images, etc.). Exemplary users may include lay (i.e., non-technical) people as opposed to IT personnel.

Communications media 16 includes one or more communications medium configured to communicate data intermediate clients 12 and appliances 14 of communications system 10. For example, one or more communications medium may comprise a communications network which may be embodied as a private and/or public network and may utilize packet-switched TCP/IP communications in one implementation. In more specific examples, communications networks include a zero-configuration network, UPnP based network or an IT-administrated network. A network may include a plurality of nodes such as switches, routers or other devices (i.e., devices not typically accessed by the exemplary above-defined users during normal operations) capable of receiving electronic communications and forwarding the electronic communications to appropriate recipients.

Individual ones of clients 12 and appliances 14 and other electronic devices configured to communicate using communications media 16 may be individually considered to be associated with communications media 16 and may have a respective unique communications address identifying the association and usable by communications media 16 and communicating devices to direct communications to appropriate recipients as well as identify a respective sending device of communications.

As described further below, clients 12 and/or appliances 14 may be configured to communicate verification information and data content using a single communications medium of the media 16. Exemplary verification information includes a signed certificate usable to verify one or more aspect of a given client 12 and/or appliance 14. Exemplary communicated data content may include data perceptible by a user during typical usage and may include email, a print job, a photograph, an electronic file, or other formatted data content convenient for communication between a sending device and a recipient device. In another embodiment, an individual communications medium may be dedicated to implement communications of verification information while another individual different communications medium may be dedicated to implement communications of data content. Other embodiments are possible.

Further, according to additional aspects another communications medium 17 may be configured to initiate verification operations of a client 12 and/or an appliance 14 as described further below. For example, communications device 15 is configured to utilize a communications medium 17 (e.g., electromagnetic energy) to implement communications external of communications media 16 in one embodiment. Communications device 15 and one or more client 12 and/or appliance 14 may be configured to communicate with one another apart from communications media 16. Communications medium 17 includes any appropriate configuration and may provide wired and/or wireless communications. In yet another aspect, verification operations may be initiated using communications of media 16.

Referring to FIG. 2, an exemplary configuration of an appliance 14 is shown. The depicted appliance 14 includes a communications interface 20, processing circuitry 22, storage circuitry 24 and a user interface 26. Other circuitry or components may be provided in other embodiments and corresponding to the respective implementation or configuration of appliance 14 (e.g., appliance 14 may include a print engine in a printer configuration). In addition, individual clients 12 may be similarly configured as appliance 14 in one arrangement and may individually include a communications interface, processing circuitry, storage circuitry and a user interface as well as any additional components or circuitry applicable to the respective implementation of client 12.

In one embodiment, processing circuitry 22 may comprise circuitry configured to implement desired programming. For example, processing circuitry 22 may be implemented as a processor and/or other structure configured to execute executable instructions including, for example, software and/or firmware instructions. Other exemplary embodiments of processing circuitry include hardware logic, PGA, FPGA, ASIC, state machines, and/or other structures. These examples of processing circuitry 22 are for illustration and other configurations are possible. Processing circuitry 22 may formulate communications for external communication, process received communications, implement exemplary secure communications procedures described herein, and/or control and/or monitor other operations of the respective device in one embodiment. In some arrangements, a certificate authority may be embodied or embedded within appliance 14 and processing circuitry 22 may perform certificate authority operations with respect to signing certificates or other operations.

Storage circuitry 24 is configured to store electronic data and/or programming such as executable instructions (e.g., software and/or firmware), data, or other digital information and may include processor-usable media. Processor-usable media includes any article of manufacture which can contain, store, or maintain programming, data and/or digital information for use by or in connection with an instruction execution system including processing circuitry in the exemplary embodiment. For example, exemplary processor-usable media may include any one of physical media such as electronic, magnetic, optical, electromagnetic, infrared or semiconductor media. Some more specific examples of processor-usable media include, but are not limited to, a portable magnetic computer diskette, such as a floppy diskette, zip disk, hard drive, random access memory, read only memory, flash memory, cache memory, and/or other configurations capable of storing programming, data, or other digital information. As described further below, storage circuitry 24 may be configured to store certificates, keys (e.g., public and private) and other desired information.

User interface 26 may include a display configured to depict information to a user as well as a keyboard or other input device configured to receive input from a user.

At least some aspects described herein are directed towards implementing communications of increased security intermediate plural devices such as clients 12 and appliances 14. For example, as described below, exemplary aspects provide verification operations which enable an appropriate client 12 to certify the provenance or authenticity of a communications address of a respective appliance 14.

According to one embodiment, an individual appliance 14 may be associated, with a certificate authority (CA). In accordance with the described embodiment, a trusted association is established between the appliance 14 and the certificate authority to provide verification operations, such as certification of the provenance of the communications address of the appliance 14, at a later moment in time. The trusted association may be established via a unique secret (e.g., prime number) shared between the appliance 14 and the certificate authority in one arrangement. In another arrangement, the certificate authority may be physically associated with appliance 14 (e.g., embodied or embedded internally of appliance 14 as mentioned above) to establish the trusted relationship, or the trusted relationship may be provided in any other appropriate manner. A source (e.g., manufacturer) of appliances 14 may have a trusted relationship with a certificate authority and through the relationship the source is able to produce serial numbers of individual appliances 14 which illustrate that the respective appliances 14 were trusted by the source and the source was trusted by the certificate authority (i.e., appliances 14 were authentically manufactured by the source also referred to as non-repudiation).

After manufacture, an appliance 14 may be deployed for operation. For example, during deployment, an appliance 14 may be associated with communications medium 16 to interact with clients 12 and perhaps other appliances 14. During the association, a communications address of the communications medium 16 may be assigned to the respective appliance 14. Thereafter, communications may be implemented between the appliance 14 and communications medium 16 using the communications address. Exemplary aspects are described below enabling the certification of the provenance of the communications address of the appliance 14 to provide communications intermediate clients 12 and the appliance 14. According to some aspects, a plurality of communications addresses may be associated with an individual appliance 14. For example, the addresses may be respectively used at appropriate moments in time (e.g., communications occur inside or outside of a firewall, etc.). The plurality of communications addresses may be provided within a signed certificate for announcement by appliance 14 described further below.

The certificate authority may create a signed certificate which includes the communications address(es) associated with the appliance 14. After creation, the signed certificate may be stored internally of the respective appliance 14 in one embodiment.

Appliances 14 individually make their respective communications addresses available to clients 12 and perhaps other devices of the communications system 10 using respective signed certificates according to some aspects. Appliances 14 may announce respective signed certificates responsive to detection of an action such as one or more triggering event. In one example, external communications device 15 may be configured to initiate verification operations performed by one or more appliance 14 to provide the triggering event. In a more specific exemplary embodiment, device 15 may emit an external communication (e.g., according to a Bluetooth protocol) which when received by an appliance 14 initiates the receiving appliance 14 to output the signed certificate which may be utilized to certify the provenance of the communications address of the appliance 14 as described in further detail below. For example, client 12, appliance 14 and/or communications device 15 may provide proximity reader communications to initiate the communications of the signed certificate.

In yet another possible embodiment, communications from external communications device 15 to initiate verification operations may be communicated using communications media 16. In another embodiment, a user may access a user input of user interface 26 at an appropriate moment in time to initiate the outputting of the signed certificate from the appliance 14. In another implementation, processing circuitry 22 of appliance 14 may monitor time intervals and initiate the communication of the signed certificate following the detection of an action including an elapse of a predetermined period of time (e.g., to provide periodic communications of the signed certificate). Other triggering events may be used in other aspects.

As described above according to exemplary embodiments, appliances 14 announce the signed certificates including outputting internally stored signed certificates. In some embodiments, announcement of the signed certificates may be independently initiated by appliances 14 or responsive to external stimulus. In additional embodiments, appliances 14 may encode or encrypt signed certificates prior to announcement of the certificates for subsequent decoding or decryption by clients 12.

In one communications example mentioned above, communications media 16 may comprise a first communications medium for communications of data content and a second communications medium for communications of the signed certificates. A medium comprising a networking protocol may be used for communicating the signed certificates wherein the certificates can individually be sent to multiple participants (e.g., clients 12) during a single announcement. Clients 12 may listen on the medium comprising a multicast channel for the signed certificates according to the presently described example and thereafter utilize the first communications medium to provide communications of data content if the provenance of the communications address of the respective appliance 14 is certified.

Clients 12 may access the announced signed certificates to certify the provenance of the communications addresses of the appliances 14. In some arrangements, clients 12 are individually configured to search for the presence of the announced signed certificates. The announcements may individually include an appropriate identifier which indicates to clients 12 that a signed certificate is contained therein. Other embodiments are possible to provide for the communication of the signed certificates from appliances 14 to clients 12.

Clients 12 receiving signed certificates are arranged to verify verification information (e.g., communications address of appliance(s) 14) contained therein. In a first aspect, clients 12 verify the signed certificates themselves and thereafter verify the communications address(es) contained within the signed certificate(s). In one embodiment, clients 12 identify the signing entities of the source certificates (e.g., the respective certificate authorities). The respective appliances 14 may be verified as authentic if the signing entities of the signed certificates are proper (e.g., proper certificate authorities). Provenances of the communications addresses from selected ones of the appliances 14 may be rejected if the respective signing entities of the certificates are not proper.

Also according to the described embodiment, clients 12 extract communications addresses from the signed certificates. The clients 12 may also access information regarding respective sender addresses regarding the entities which announced the signed certificates (i.e., appliances 14). In one verification embodiment, clients 12 are configured to compare the communications addresses extracted from the signed certificates with respective ones of the sender addresses order to certify the provenances of the respective communications addresses. If verification is proper, clients 12 may implement communications with respect to verified ones of the appliances 14. If verification is not proper (e.g., certificates or signing entities not proper, or addresses do not match), clients 12 may disable any communications with respect to the appliances 14 and may also inform a network administrator or other appropriate personnel.

Once verification is completed, encrypted communications between clients 12 and verified appliances 14 may occur using the communications address extracted from the signed certificate. In one embodiment, a client 12 may create a session key and encode (e.g., encrypt) data content to be communicated (e.g., print job) using the session key. In one example, a client 12 may encrypt the session key with an appliance public key received in a signed certificate, attach the encrypted session key to the beginning of an encrypted message including data content, and communicate the encrypted message to appliance 14. Accordingly, in one embodiment, clients 12 and appliances 14 may secure communications using a key derived from information contained within the signed certificate.

Additional information may also be communicated from appliances 14 to clients 12 using the signed certificates. In one exemplary embodiment, the additional information may include a manufacturing attribute of an appliance 14 which may include manufacturer and appliance identification information (e.g., manufacturer identification, model number and/or serial number) of the respective appliance 14. Additional exemplary information which may be included in signed certificates includes physical location information of the appliance 14 (e.g., GPS coordinates, floor or mail stop location information, etc.).

Referring to FIGS. 3-4, methods for providing certification of a provenance of a communications address of an appliance are shown according to exemplary embodiments. Other methods including more, less or alternative steps are possible.

FIG. 3 illustrates a method for generating verification information according to one embodiment.

Initially, at a step S10, an appliance to be deployed may be manufactured or otherwise provided.

At a step S12, a trusted association is established between the appliance and a certificate authority.

At a step S14, the appliance may be deployed including associating the appliance with communications media.

At a step S16, a communications address of the communications media associated with the appliance may be identified upon the deployment.

At a step S18, a signed certificate including the communications address of the appliance is created by the certificate authority.

At a step S20, the appliance announces the signed certificate including the communications address. The announcement may be implemented responsive to one or more different triggering event in exemplary embodiments and as described above.

Referring to FIG. 4, an exemplary method is shown for using a signed certificate to implement communications in accordance with one embodiment.

At a step S30, a client may search an associated communications media for desired services (e.g., provided by one or more of appliances 14).

At a step S32, the client may obtain one or more signed certificate responsive to the searching of step S30.

At a step S34, the client may use the signed certificate to verify the provenance of communications address(es) associated with the appliance. As described above, an exemplary verification operation includes comparing a communications address extracted from the signed certificate with a sender address from which communication of the signed certificate originated. If verification fails, the method may cease at step S34.

At a step S36, if verification is proper, the client obtains data content (e.g., a print job) for communication to the appliance.

At a step S38, the client encrypts the data content for example using a session key in one arrangement. Also, the client may encrypt the communication itself using for example a public key of the appliance.

At a step S40, the client communicates the encrypted data content to the appliance along with the encrypted session key in at least one embodiment.

The protection sought is not to be limited to the disclosed embodiments, which are given by way of example only, but instead is to be limited only by the scope of the appended claims.

What is claimed is:

1. A method comprising:
    accessing verification information including an identifier certificate, wherein the identifier certificate includes an electronic address corresponding to an association of an appliance with a communications media;
    verifying that the identifier certificate was signed by a proper certificate authority;
    accessing an electronic address of the appliance, wherein accessing the electronic address of the appliance is separate from the identifier certificate;
    verifying the electronic address using the identifier certificate and the electronic address accessed separately from the identifier certificate;
    encrypting data using a first communication channel for communication to the appliance responsive to verification of the electronic address;
    communicating the encrypted data to the communications media using a second communication channel;
    creating a session key;
    encoding data to be communicated using the session key; and
    communicating the encoded data using the second communication channel.

2. The method of claim 1, wherein verifying the electronic address further comprises comparing the electronic address accessed from the identifier certificate with the electronic address accessed separately from the identifier certificate.

3. The method of claim 1, further comprising disabling communications with the appliance in response to a determination that the verification information is improper.

4. The method of claim 3, further comprising outputting an indication that the verification information is improper.

5. The method of claim 1, further comprising verifying a source of the appliance using the verification information.

6. The method of claim 1 further comprising:
encrypting the session key using an appliance public key, wherein the appliance public key is included within the verification information;
attaching the encrypted session key to a beginning of the encrypted data including the encoded data; and
communicating the encrypted data, wherein communicating the encrypted data includes communicating the encoded data.

7. The method of claim 1, wherein the verification information further includes:
a manufacturing attribute of the appliance; and
physical location information of the appliance.

8. The method of claim 1, wherein:
accessing the verification information includes accessing the verification information from the appliance; and
the identifier certificate is created using a certificate authority.

9. A device comprising:
a processor; and
a memory storing machine readable instructions to cause the processor to:
access verification information including an identifier certificate, wherein the identifier certificate includes an electronic address corresponding to an association of an appliance with a communications media;
verify that the identifier certificate was signed by a proper certificate authority;
access an electronic address of the appliance, wherein the electronic address of the appliance is accessed separately from the identifier certificate;
verify the electronic address of the appliance accessed separately from the identifier certificate using the electronic address included in the identifier certificate;
encrypt data using a first communication channel for communication to the appliance responsive to verification of the electronic address accessed apart from the identifier certificate;
communicate the encrypted data to the communications media using a second communication channel;
create a session key;
encode data to be communicated using the session key; and
communicate the encoded data using the second communication channel.

10. The device of claim 9, wherein the instructions to verify the electronic address include instructions to compare the electronic address accessed from the identifier certificate with the electronic address accessed separately from the identifier certificate.

11. The device of claim 9, further comprising instructions to disable communications with respect to the appliance in response to a determination that the verification information is improper.

12. The device of claim 11, further comprising instructions to output an indication that the verification information is improper.

13. The device of claim 9, further comprising instructions to verify a source of the appliance using the verification information.

14. The device of claim 9, further comprising instructions to:
encrypt the session key using an appliance public key, wherein the appliance public key is included within the verification information;
attach the encrypted session key to a beginning of the encrypted data including the encoded data; and
communicate the encrypted data, wherein the instructions to communicate the encrypted data include instructions to communicate the encoded data.

15. The device of claim 9, further comprising instructions to access the verification information from the appliance, wherein the identifier certificate is created using a certificate authority.

16. A non-transitory computer readable medium storing machine readable instructions executable by a processor to cause the processor to:
access verification information including an identifier certificate, wherein the identifier certificate includes an electronic address corresponding to an association of an appliance with a communications media;
verify that the identifier certificate has been signed by a proper certificate authority;
access an electronic address of the appliance, wherein the electronic address of the appliance is accessed separately from the identifier certificate;
verify the electronic address of the appliance accessed separately from the identifier certificate using the electronic address included in the identifier certificate;
encrypt data for communication to the appliance in response to verification of the electronic address accessed separately from the identifier certificate, wherein the data is encrypted using a first communication channel;
create a session key;
encode data to be communicated using the session key;
encrypt the session key using an appliance public key, wherein the appliance public key is included within the verification information;
attach the encrypted session key to a beginning of the encrypted data including the encoded data; and
communicate the encrypted data to the communications media using a second communication channel, wherein the encrypted data includes the encoded data.

17. The non-transitory computer readable medium of claim 16, further comprising instructions to access the verification information from the appliance, wherein the identifier certificate is created using a certificate authority.

* * * * *